Patented Nov. 8, 1949

2,487,105

UNITED STATES PATENT OFFICE 2,487,105

COMPOSITION CAPABLE OF BEING MOLDED AND BEING CAST INTO FILMS

Ralph T. K. Cornwell, Fredericksburg, Va., assignor, by mesne assignments, to American Viscose Corporation, Wilmington, Del., a corporation of Delaware No Drawing. Application September 28, 1945, Serial No. 619,259

9 Claims. (Cl. 106—178)

This invention relates to a new series of plasticizers and, more particularly, to compositions including an organic plastic material plasticized by an ester of an aromatic acyl hydroxy amine.

Plastic compositions such as cellulose ester or ether plastics and phenol aldehyde, amine aldehyde, and alkyd resins frequently require a plasticizer or softener to render them less brittle and more easily workable. Plasticizers or softeners are also used in lacquers and varnishes for imparting the desired flexibility to the films formed therefrom. Many substances have been proposed as plasticizers, one of the principal classes being esters.

Plasticizers are also employed in heat-sealing coating compositions in order to reduce the temperature at which the film ordinarily softens. Such coatings, for example, have found application upon films used in packaging foodstuffs and other materials which require moisture-impervious and air-impervious wrappers. Coated cellophane of this type has proved quite valuable However, few plasticizers heretofore available for such heat-sensitive coatings have reduced the softening point of the coating to a low enough temperature without making the coating sticky at room temperature or under 50° C. On the other hand, coatings which do not seal at temperatures between 50° C. and 85° C. are not desirable upon cellophane because of the excessive heat required to fuse the contiguous surfaces.

Now, in accordance with this invention, plasticizers are prepared which reduce the softening point of heat-sensitive compositions to a temperature which permits their use with cellophane without increasing their tackiness at room temperature. The plasticizers of this invention are organic acid esters of an aromatic acyl hydroxy amine and may be represented by the general formula:

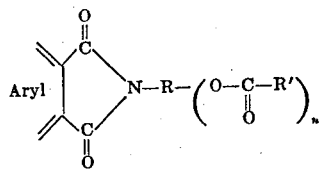

where:

Aryl=The residue of any aromatic acid having at least two carboxy groups on adjacent ring carbon atoms.

R=A straight or branched-chain aliphatic radical.

R'=An aliphatic, aromatic, or cycloaliphatic radical.

$n=1$ or more. The value of $n$ may equal or be less than, but may not exceed, the number of hydroxy groups carried on the aliphatic radical R.

These novel plasticizers may be prepared from an aromatic dicarboxylic acid, an alkanol amine, and an additional acid which may be the same as the aromatic acid first employed or which may be a different organic acid selected from the group consisting of aromatic, aliphatic, and cycloaliphatic acids. These ingredients may be reacted in any order; however, it is generally preferable to form the arylimido alcohol first and then esterify it with the desired acid.

The preparation and application of these novel plasticizers are illustrated in the following examples:

Example I

This example illustrates the preparation of the esters disclosed herein.

One hundred forty-eight pounds of phthalic anhydride was placed in a reaction vessel and 35 gallons of toluene added. The toluene was heated to boiling and 65 pounds of monoethanolamine was added slowly and carefully. The reaction was violent and much heat was liberated. The solution was then refluxed for four hours, during which period the following reaction occurred:

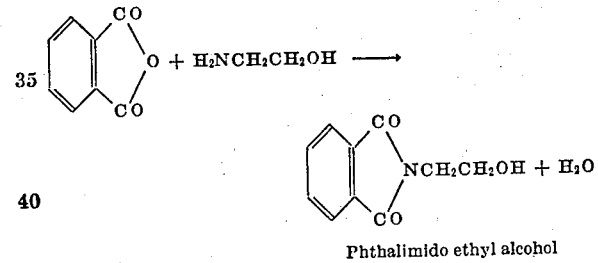

Phthalimido ethyl alcohol

The water formed in the course of the reaction was continuously separated out. A small quantity of the amino ethyl ester of phthalic acid was formed as a by-product. This quantity was so small that it was not necessary to remove it. However, where a pure arylimido alcohol is desired, the ester may be separated by extraction with dilute alkali or acid.

Four pounds of 60° Be. sulfuric acid, together with 75 pounds of propionic acid was then added to the solution. Refluxing was resumed to bring about reaction of the arylimido alcohol with the propionic acid. This reaction may be illustrated as follows:

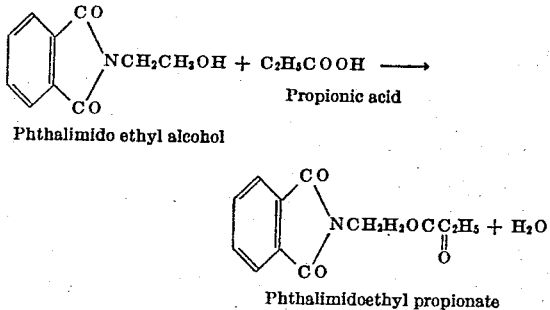

Phthalimido ethyl alcohol

Phthalimidoethyl propionate

After esterification was complete, the mixture was cooled. This required approximately twelve hours of refluxing; water continuously separated out during refluxing. The toluene was distilled, leaving the solid amido ester which may be recrystallized from high-boiling petroleum ether, is desired.

The following are examples of lacquers and compositions containing the plasticizing ester of the invention, these parts or percentages being by weight:

Example II

Lacquers were prepared employing the following formulations:

|  | Parts | |
|---|---|---|
|  | 1 | 2 |
| Cellulose acetate | 20 | 20 |
| Phthalimidoethyl butyrate | 10 | |
| Phthalimidoethyl acetate | | 10 |
| Synthetic resin of phenol formaldehyde type | 25 | 25 |
| Acetone | 100 | 100 |
| Alcohol | 20 | 20 |
| Benzene | 50 | 50 |
| Diacetone alcohol | 30 | 30 |

The first formulation gave a clear lacquer which remained stable indefinitely. This lacquer deposited hard glossy films which, upon flexible surfaces, showed no indication of cracking. The plasticizer did not bleed out of the film.

The second formulation gave a cloudy lacquer which soon deposited a sludge of phthalimidoethyl acetate crystals. The formulation was therefore not suitable for use as a lacquer.

Example III

Moistureproofing coating compositions were prepared according to the following formulations:

|  | Parts | | | | |
|---|---|---|---|---|---|
|  | 1 | 2 | 3 | 4 | 5 |
| Nitrocellulose (5-6 sec.) | 45 | 30 | 50 | 40 | 45 |
| Phthalimidoethyl propionate | 20 | 30 | 35 | 35 | 22 |
| Dibutyl phthalate | 10 | 5 | | | 7½ |
| Paraffin, M. P. 67° C | 5 | 5 | 4 | 4½ | 5 |
| Dammar gum | | 30 | | 20 | |
| Ester gum | 20 | | 10 | | 20 |
| Blown rapeseed oil | | | 1 | ½ | ½ |

These compositions were heat sealed at temperatures below 85° C. The coating when tested upon cellophane was impervious to moisture and was not tacky at room temperature.

For purposes of easy application, the compositions may be dissolved in solvents employing about 10 parts of the above composition in about 250 parts of solvent. A solvent mixture containing 15 parts ethyl acetate, 15 parts butyl acetate and 70 parts toluene has been found satisfactory. The solution may then be applied as a coating and dried in the usual way or formed into sheets or films.

Phthalimidoethyl formate, acetate, and benzoate when tested in these formulations tended to crystallize out of the coating film, forming a white crystalline layer upon its surface. This of course left the film unplasticized, in addition to detracting from its appearance.

Example IV

A lacquer was prepared containing 100 parts of standard ethyl cellulose and 20 parts of phthalimidoethyl propionate. Films deposited by this lacquer dried in one-half hour at 70° C. and had a thickness of 0.04 mm. The films were colorless, clear, hard and glossy, and provided an excellent hard waterproofing finish on paper or cloth.

When phthalimidoethyl acetate was used in place of phthalimidoethyl propionate, however, crystals appeared on the surface of the film, indicating that the plasticizer had crystallized and crept out of the film; the formate and benzoate showed the same tendency.

Example V

A composition was prepared comprising 67.5% of high viscosity ethyl cellulose, 30.2% of phthalimidoethyl isobutyrate and 2.3% of stearic acid. This composition was employed as an extruded coating for wire where it gave a tough, highly flexible, water-resistant coating having good electrical properties.

Example VI

Heat-sealable coating compositions adapted to be applied either as a hot mold or in solution were prepared according to the following formulations:

|  | Parts | | |
|---|---|---|---|
|  | 1 | 2 | 3 |
| Nitrocellulose | 44 | 60 | 40 |
| Phthalimidoethyl n-hexanate | 35 | 25 | 35 |
| Dibutyl sebacate | 5 | 0.1 | 0.1 |
| Dewaxed dammar gum | 10 | 1 | 8 |
| Run copal | 1 | 10 | 10 |
| Blown rapeseed oil | 0.5 | 0.25 | 0.5 |
| Paraffin wax | 4.5 | 3.5 | 6.4 |

These compositions when coated upon cellophane were found to heat seal at temperatures below 85° C. The coatings were non-tacky at room temperatures and the plasticizers showed no tendency to bleed out of the films.

The n-hexanate may be replaced with the propionate, the proportions of the other ingredients being the same. When substituting the propionate, however, the blown rapeseed oil may be present in an amount of 0.01 to 0.5 part by weight and the paraffin wax may be from 4 to 7 parts by weight.

Example VII

The following formulations were found to be suitable for coatings, films and sheets characterized by a high degree of moistureproofness, transparency, flexibility and non-tackiness at room temperature, while being readily heat sealable at temperatures below 85° C.:

|  | Parts | | | |
|---|---|---|---|---|
|  | 1 | 2 | 3 | 4 |
| Nitrocellulose, 30 sec | 50 | 57 | 62.2 | 45.5 |
| Naphthalimidoethyl propionate | 26 |  |  | 8 |
| Phthalimidoethyl palmitate |  | 20 | 10 |  |
| Acetyl derivative or toluyl benzoic acid |  | 25 |  | 10 |
| Dibutyl phthalate |  |  | 5 | 10 |
| Ethyl o-benzoyl benzoate | 9.5 | 15 | 15 | 10 |
| Paraffin | 2 | 2 | 0.8 | 3 |
| Ozokerite |  |  | 0.5 |  |
| Spermaceti |  |  | 0.5 |  |
| Blown rapeseed oil | 2.5 | 1 |  | 0.5 |
| Resin (natural and/or synthetic) |  |  |  | 13 |
| Hydrogenated vegetable oil |  |  | 0.5 |  |

Example VIII

Polyvinyl chloride (60 parts) was blended with 40 parts of phthalimidoethyl caprate. A bar was then formed with this plasticized composition, chilled to 5° C. and then bent double. The bar did not break. This test was repeated at 0° C., −5° C., −10° C., −15° C. and −20° C. The bar did not break at any of these temperatures.

A double loop of wire about 2 feet in diameter was insulated with the composition and chilled to −20° C. It was then beaten with as much force as possible. The insulation did not break. Under this test a composition containing 60 parts polyvinyl chloride and 40 parts tricresyl phosphate broke at 10° C.

Example IX

Phthalimidoethyl propionate (15 parts) was blended with 85 parts of freshly prepared fusible glycerol phthalate resin. The mixture was heated with a vigorous stirring until a homogeneous composition was obtained. The product was moldable under pressure to form an infusible article which was well plasticized and easily machinable. The plasticizer did not crystallize, nor did it bleed out of the resin. Fillers may be incorporated, if desired.

Example X

A fusible phenol-furfural condensation product was prepared in the usual manner. Water and free alkali present were removed and approximately 12 parts of phthalimidoethyl propionate was incorporated, using sufficient heat to render the mixture fluid. The plasticizer powder was then ground and used as a molding composition.

Another portion of the same material was extruded in the form of a sheet and then hardened in the usual manner. The molding composition showed good flow properties during molding while the sheet had a high degree of flexibility.

Example XI

Phthalimidoethyl palmitate-stearate (20 parts) was added to a liquid condensation product of phenol formaldehyde. Condensation was continued until the resin was solid at room temperature and the mixture was then dissolved in a lacquer solvent. Pigments were added and the composition was then spread on a clean metal surface. The film was baked to complete the polymerization of the resin to an infusible stage. A very flexible glossy film was obtained.

Example XII

A fusible resoin was prepared by the polymerization of styrene together with a small amount of vinyl chloride and was mixed with 5% of naphthalimidoethyl hexanate and then hardened in the usual manner. The product could be extruded in the form of thin sheets or threads which were flexible and had a high tensile strength.

Example XIII

A fusible resin prepared by the copolymerization of vinyl acetate and vinyl chloride was mixed with 8% of phthalimidoethyl propionate. The mixture was extruded in the form of threads which showed excellent flexibility. The plasticizer did not bleed out of the thread.

Example XIV

A polymerized coumarone indene resin was prepared and mixed with 10 parts of phthalimidoethyl propionate. The thermoplastic product had a high degree of flexibility and was fusible in flooring compositions and as coating for wire.

Example XV

A resin was prepared by slowly heating 75 parts of Congo resin, 50 parts of phthalic anhydride and 35 parts of glycerol to 230° C.; 25 parts of pyromellitic diimidol ethyl propionate was added to the reaction mixture after cooling. Suitable fillers were then added, and after thorough incorporation of these ingredients the material was molded to an infusible product.

Example XVI

A coating composition was prepared containing the following ingredients dissolved in a solvent mixture containing 17% acetone, 10% ethyl acetate, 8% ethyl alcohol, 20% toluene, 22% monomethyl ether of ethylene glycol and 3% diacetone alcohol:

|  | Parts |
|---|---|
| Cellulose acetate | 12 |
| Phthalimidoethyl propionate | 6 |
| Diethyl phthalate | 4 |
| Solvent | 178 |

Example XVII

A moistureproofing composition for cellophane was prepared containing the following ingredients:

|  | Parts |
|---|---|
| Nitrocellulose (5–6 sec.) | 9 |
| Urea-formaldehyde resin | 68 |
| Phthalimidoethyl propionate | 14 |
| Hardening substance | 9 |

The composition was applied in solution (1% to 15% solids) to the pellicle and the coated pellicle was then subjected to an elevated temperature to evaporate the solvents and produce condensation of the urea resin to the insoluble stage. In addition to producing further condensation of the resins and evaporation of the solvent, the coating which was formed was firmly anchored to the pellicle to the extent that it was not affected by water even when immersed for a long period of time. During heating, the temperature was maintained at 77° C. to 99° C. for approximately two minutes. At lower temperatures the urea resin coating became partially resinified so that the top or second coating could be applied. On standing for some time, the urea resin coating automatically continued to condense to the insoluble stage.

The coating may have any degree of moistureproofness imparted thereto up to the point of becoming "moistureproof" within the definition previously given by adding 0.5% to 2% of paraffin without materially affecting the adherence of the coating to the base when immersed in water.

*Example XVIII*

One mole of urea was mixed with two moles of aqueous formaldehyde and one-eighth mole of ammonia in a concentrated aqueous solution. A small amount of calcium carbonate was added and the mixture then boiled until condensation of the urea and formaldehyde had taken place. The solution was then concentrated by evaporation to a thick syrup. The mineral alkali present inhibited gelation of the condensation product during the evaporation process. The syrupy liquid was then cooled and mixed with 0.1 mole of $\beta$-bromocinnamic acid and 0.25 mole of phthalimidoethyl propionate, and the alkaline mixture was then evaporated and dried in vacuum. The solid material was powdered and molded under heat and pressure in the form of small drinking cups. During molding the latent curing catalyst assisted completion of the polymerization reaction while the phthalimidoethyl propionate improved the flow of the composition. The plasticizer showed no tendency to crystallize out of the molded article.

*Example XIX*

Dicyandiamide (23.6 parts by weight) and 26.4 parts of 82% phenol were heated and refluxed with continuous agitation for four hours in a nitrogen atmosphere. Shortly after the refluxing was begun, an evolution of ammonia was noted. Refluxing was continued until about 0.15 mole of ammonia had been given off for each mole of dicyanamide charged. The agitation and treatment with inert gas was continued thereafter to sweep out the last traces of ammonia, after which the mixture was cooled to below 100° C.

Sodium hydroxide was added to 60.8 parts of 37.5% formaldehyde solution until the mixture had a pH of 9. This solution was then added to the cooled reaction mixture and the condensation was carried out with refluxing at 96° C. to 98° C. for two hours. After about an hour of refluxing, 10 parts of phthalimidoethyl propionate was added to the reaction mixture. The solvent was then removed by heating in vacuum. Four hundred parts of the resin was then made into a molding compound by intimately mixing with four parts of calcium stearate, 400 parts of wood flour and 2 parts of phthalic acid together with sufficient red dyestuff to give the material a good deep color. After blending, the mixture was compounded on steamheated differential rolls at 100° C. to 110° C. The resulting mixture exhibited excellent flow during molding and gave molded articles of excellent heat and water resistance and electrical properties.

Although other methods of their preparation will be apparent to those skilled in the art, the plasticizers are, in general, prepared by reacting three substances: an aromatic dicarboxylic acid or an anhydride, a hydroxy amine and a second organic acid of the aliphatic, aromatic or cyclic series. It is preferable to form the arylimido alcohol first; that is, to react the dicarboxylic acid or hydroxy amine. The unreacted hydroxy groups on the amine are then esterified by reaction with the second acid.

Where one of the reactants is a solid, or where the reactants are immiscible, the reactions are best conducted in a liquid solvent medium. The solvent is then refluxed until reaction is complete. This of course necessitates the use of a solvent whose boiling point approximates the temperature at which imidation or esterification occurs. Toluene, o, m, or p-xylene, n-decane and other high-boiling saturated and unsaturated hydrocarbon solvents may be used.

The aromatic dicarboxylic acid employed must have at least two carboxylic acid groups attached to adjacent ring carbon atoms. The acid may contain other carboxy groups in addition to this if an acidic plasticizer is desired. The ring may also carry other substituents such as chlorine, bromine, alkyl, aldehydo and ketonic groups. Typical acids which have been found satisfactory include phthalic, hemimellitic, trimellitic, chlorophthalic, p-methyl phthalic, prehnitic, mellophanic, naphthalic and pyromellitic acids. An unusual plasticizer may be prepared by employing pyromellitic or mellophanic acid, since these compounds, having four carboxylic groups in two operative pairs, will form diimido alcohols.

The amino alcohols should have at least one amino group having two substitutable hydrogen atoms. Secondary and tertiary amines are consequently inoperative in this invention since they are not capable of forming imides. The aliphatic chain to which the amino group is attached, however, may be straight or branched and may contain one or more esterifiable hydroxy groups. Thus, hydroxy amines which have been found suitable in the practice of this invention include mono hydroxy amines such as ethanolamine, butanolamine, pentanolamine, hexanolamine, cyclohexyl-ethanolamine, isobutanolamine and laurylolamine; dihydroxy amines such as 1,2,-dihydroxy-n-propylamine, 2,-4,-dihydroxy butylamine, 2-amino, 1,-2,-dihydroxy sec-butylamine. Similarly, trihydroxy and higher hydroxy amines may be employed.

The second acid may include any aromatic, aliphatic or cyclic monocarboxylic acid such as acetic acid, propionic acid, stearic acid, palmitic acid, butyric acid, caproic acid, caprylic acid, lauric acid, myristic acid, oleic acid, linoleic acid, linolenic acid, malic acid, lactic acid, glycollic acid, benzoic, phenolacetic, glyoxylic, pyruvic, acetoacetic, cyclohexanoic, cyclopentanoic, and chloroacetic.

It will be understood that the anhydrides are equivalent to the acids themselves and may, in all cases, be employed in place of the acids, if desired.

The melting point and boiling point of the plasticizer obtained by the reaction of these ingredients will, of course, be determined by the ingredients themselves. Consequently, a judicious selection of ingredients will lead to a plasticizer of any desired melting point. In general, it is preferable to employ a plasticizer whose melting point is below 65° C. Compounds of higher melting point show an undesirable tendency to crystallize out of compositions containing them and are not within the scope of this invention.

The physical properties of several esters of phthalimido ethyl alcohol are listed in the following table:

TABLE

Esters of phthalimidoethyl alcohol

|  | Solidifying Point, °C. | Boiling Point, °C. |
|---|---|---|
| Formate | 88 | 165 |
| Acetate | 88.5 | 160 |
| Propionate | 59 | 167 |
| n-Butyrate | 56.8 | 171-73 |
| iso-Butyrate | 22-23 | 154 |
| n-Hexanate | 5-7 | 187-89 |
| 2-Ethyl Hexanate | 3-5 | 182-19 |
| Stearate-Palmitate (3:7) | 46 |  |
| Caprate | Liquid above 0 |  |
| Palmitate | 56 |  |
| Stearate | 49 |  |
| Oleate | Liquid above 0 |  |
| Benzoate | 115-6 |  |

The formate, acetate, and benzoate tend to crystallize from lacquers and moistureproofing compositions. For this reason, due to their high melting points, they are not employed in the compositions of this invention.

It is a significant advantage of the plasticizers of this invention that they are both esters and imides. They therefore possess solvent properties of both of these groups. This an important factor, since many organic plastic compositions are readily soluble in esters, but are markedly less soluble in imides. With other organic plastics the reverse is true. This makes the plasticizers of the present invention of wide application, particularly with mixed organic plastic materials.

The plasticizer of this invention may be employed to soften or increase the flexibility of the following resins and cellulose compounds, in quantities as good as 1:1, but generally in an amount up to 25% by weight, and the resin or cellulose compounds preferably between 5% and 10% by weight:

Thermoplastic resins

Polyvinyl chloride
Polyvinylidene chloride
Polystyrene
Copolymers of vinyl chloride and vinyl acetate
Copolymers of methyl methacrylate and vinyl chloride
Polyvinyl butyral
Polyvinyl acetal
Polymethyl methacrylate
Polymethyl acrylate
Polyethylene
Polyamides
Natural rubbers
Synthetic rubbers; chlorinated rubber
Polysulfides
Poly-isobutylenes, cyclized rubber, rubber hydrochloride
Buna rubber
Coumarone-indene with rubber
Oil-modified and unmodified alkyd resins prepared from dihydroxy alcohols and dicarboxylic acids
Phenol-formaldehyde resins prepared from phenols having only two reactive positions

Thermoplastic cellulose compounds

Cellulose acetate
Cellulose acetate butyrate
Cellulose acetate propionate
Cellulose propionate
Benzyl cellulose
Ethyl cellulose
Butyl cellulose
Hydroxy ethyl cellulose

Thermosetting resins

Urea-formaldehyde
Phenol-formaldehyde (phenols having three reactive positions)
Melamine-formaldehyde
Alkyd resins prepared from polyhydric alcohols and polycarboxylic acids
Phenol-furfural
Unsaturated polyesters
Polyallyl alcohol and derivatives
Protein-formaldehyde resins:
    Casein-formaldehyde
    Shellac-formaldehyde

Mixtures of thermoplastic and thermosetting resins

Polyvinyl chloride and urea-formaldehyde-butanol ether
Polyvinyl chloride and phenol-formaldehyde
Polymethacrylate and urea-formaldehyde
Polystyrene and alkyd
Coumarone-indene and alkyd
Polyvinyl acetal and melamine-formaldehyde The resin or cellulose compound may be in any form such as a sheet, tube, or molding powder, and may or may not be combined with ingredients in addition to the plasticizer, as illustrated in the examples.

The plasticizers may also be employed in coating compositions and lacquers. A number of examples of such compositions containing the plasticizers of the invention have already been given.

While it is an advantage of the present plasticizers that they possess solvent powers for so many plastic components that they can normally be used as the only plasticizer, the invention is by no means limited to plastic compositions in which it is the only plasticizer present. On the contrary, it may be associated with other plasticizers such, for example, as dibutyl phthalate, dilauryl phthalate, cyclohexyl butyl phthalate, di-(methylcyclohexyl) phthalate, di(dimethylcyclohexyl) adipate, dicyclohexyl adipate, tricresyl phosphate, esters of o-benzoyl benzoic acid such as butyl benzoyl benzoate derivatives of toluene sulfonamide, or the like.

As moistureproofing agents, waxes or wax-like material such as paraffin, petrolatum, ceresin, japan wax, palm wax, beeswax, certain chlorinated hydrocarbons, Chinese insect wax, or other synthetic waxes or wax-like materials may be used. If some of these waxes are too soft for the purpose desired, they may be mixed with harder waxes of the group or with carnauba wax, candelilla wax or other harder waxes. Generally, paraffin serves as a satisfactory moistureproofing agent which may be hardened, if necessary, by admixture with carnauba wax or candelilla wax.

As the cellulose derivative, there may be used water soluble organic or solvent soluble cellulose ethers such as glycol, ethyl, or benzyl cellulose; cellulose esters such as cellulose nitrate, which is particularly useful; cellulose acetate, which is of limited compatibility; and such mixed esters or ether-esters as cellulose acetate-nitrate, cellulose acetate-propionate or ethyl cellulose-nitrate. These cellulose derivatives may be of various degrees of conversion as, for example, cellulose nitrates of various nitrogen contents.

In the preparation of moistureproofing coating compositions comprising a cellulose derivative and a moistureproofing agent, it is advantageous to include some material which will improve the compatibility of these two ingredients. This material is referred to as a blending agent and is usually of a resinous nature, although this is not absolutely necessary. When the blending agent is resinous, advantage may be taken of its film-forming characteristics, if any, and sufficient quantity may be added to a coating composition to contribute towards the body and build of that composition in addition to the blending action. Depending on the nature of the blending agent, more or less plasticizing action on the cellulose derivative may be obtained.

As the blending agents, any of the natural or synthetic resins commonly available may be used so long as they are compatible and form homogeneous mixtures. Such resins may include ester gum, rosinates, hydrogenated rosin, hydrogenated rosin esters, dammar, copal, kauri, alkyd resins, vinyl derivatives, chlorinated diphenyl resins, and soluble resins of the phenol-formaldehyde type. Non-resinous blending agents may be used when they yield homogeneous mixtures, and these may include hydrogenated castor oil, castor oil phthalate, lanolin or wool grease, ethyl abietate, methyl abietate, diethylene glycol rosinate, diethylene glycol hydrorosinate, or the like.

It is the most convenient to apply the above lacquer and moistureproofing coating compositions to base materials, such as sheets of regenerated cellulose, by means of suitable solvents. Thus, the film-forming ingredients may be dissolved to give a coating solution of an appropriate viscosity and solids content, whereupon the solution may be applied to the desired base in accordance with the methods known in the art. The solvents may be removed and the coated base subjected to an elevated temperature at least equal to the melting point of the wax, whence, after cooling, a clear, transparent, moistureproof, coated base will be obtained.

These moistureproofing compositions may be applied to various sheet materials to produce wrapping tissues which are flexible, moistureproof and heat-sealable and which exhibit highly improved surface characteristics including excellent surface slip and resistance to caking, sticking, or marring during storage. A variety of base sheet materials may be used, such as cellulosic materials, paper, albuminous materials (gelatin, agar-agar, casein), or films made from rubber derivatives,—that is, rubber hydrochloride, chlorinated rubber, or the material prepared by reacting rubber and a metal halide such as boron trifluoride, stannous or stannic chloride, stannic acid, and other materials. In the preferred embodiment of the invention, a non-porous, non-fibrous, dense, smooth surfaced, and preferably transparent material such as regenerated cellulose, cellulose ester films including cellulose nitrate and cellulose acetate, or cellulose ether films including ethyl cellulose, benzyl cellulose, glycol cellulose, or lowly etherified cellulose such as those in which there is only one substituent group for several glucose units of cellulose, is employed.

In the coating compositions set forth in the above examples it is apparent that the proportions of the several ingredients may be varied over a considerable range. Thus, the resin, cellulose derivative or its equivalent may comprise 40% to 65% or more of the total solids, although in most instances 50% to 60% will be found most satisfactory, with approximately 55% a convenient and generally useful proportion. The ratio of cellulose derivative or resin to blending agent may vary over a wide range. The cellulose derivative is usually in excess of the total plasticizer content, and the ratio of cellulose derivative to plasticizer may vary from 1:1 to 3:1, but a ratio of 1.5:1 to 3:1 is generally found to give the best results.

The total plasticizer concentration may vary from 15% to 45% of the total solids. Low percentages of plasticizer, however, are usually used only when the blending agent is capable of exerting a plasticizing action and can therefore be added. Among the objects of the invention is the production of highly moistureproof and heat-sealable coating compositions, and for the accomplishment of this object it is usually necessary to use relatively large amounts of plasticizer. When the total plasticizer comprises substances other than hereinbefore described, such for example as dibutyl phthalate or a plasticizing blending agent, it is preferable that the imido ester predominate. Usually, 50% of more of the total plasticizer should be provided by these substances, although as little as 25%, or even less, may be used with certain plasticizers without completely eliminating the unique properties of these specific plasticizers.

Though the moistureproofing compositions have been described specifically for coating, it is to be understood that they may also be cast in any known manner to produce self-sustaining, flexible, transparent, moistureproof and heat-sealable film which exhibits highly improved surface characteristics, including excellent surface slip and resistance to caking, sticking or marring during storage.

Where percentages and proportions are referred to throughout the specification, they represent parts by weight, unless otherwise indicated.

Other compounds of the present invention have many and varied uses; for example, in the textile industries they may be used as delusterants, lubricants, fillers, wetting assistants, masking agents, and waterproofing agents, softeners and plasticizers; in the lacquer industries as fillers, thickeners, plasticizers and moistureproofing and slip producing agents; in the adhesive industries as softeners, plasticizers, body-producing agents, blenders, and tack-producing and controlling agents; in the mechanical industries as lubricants, pour depressants for other lubricants, and for cooling liquids; and, certain of these compounds have interesting therapeutic and narcotic properties and are accordingly useful in the field of medicinals.

This application is a continuation-in-part of application for United States Letters Patent Serial Number 420,857 (abandoned), filed November 28, 1941, to Ralph T. K. Cornwell.

Having described my invention, what I claim as new and desire to secure by Letters Patent is:

1. A heat-sealable coating composition comprising as parts by weight, nitrocellulose 40 to 60, phthalimidoethyl propionate 25 to 35, dibutyl sebacate 0.1 to 5, dewaxed dammar gum 1 to 10, run copal 1 to 10, blown rapeseed oil 0.01 to 0.5, and paraffin 4 to 7.

2. A moistureproof film-forming or coating composition comprising nitrocellulose, phthalimidoethyl propionate as a plasticizer, dibutyl sebacate, dewaxed dammar gum, run copal, blown rapeseed oil and paraffin wax, the ratio between the nitrocellulose and the propionate being between 1:1 and 3:1.

3. A composition of matter comprising an organic plastic film-forming material, selected from the group consisting of thermoplastic and thermosetting materials which need plasticizing and are capable of forming water-proofing and heat-sealing compositions, and a plasticizer therefor comprising an ester of an aliphatic acid having at least three carbon atoms and an N-hydroxyalkyl cyclic amide of an aromatic dicarboxylic acid having the carboxyl groups on adjacent carbon atoms, the hydroxyalkyl group having from 1 to 12 carbon atoms, the film-forming material being present in a proportion of 40 to 95% by weight of the total solids in the composition, and the ester being present in a proportion of 5 to 45% by weight of the total solids.

4. A composition of matter comprising an organic plastic film-forming material, selected from the group consisting of thermoplastic and thermosetting materials which need plasticizing and are capable of forming water-proofing and heat-sealing compositions and a plasticizer therefor comprising an ester of a fatty acid having at least three carbon atoms and a hydroxyalkyl phthalimide, the hydroxyalkyl group having from 1 to 12 carbon atoms, the film-forming material being present in a proportion of 40 to 95% by weight of the total solids in the composition, and the ester being present in a proportion of 5 to 45% by weight of the total solids.

5. A composition of matter comprising an organic plastic film-forming material, selected from the group consisting of thermoplastic and thermosetting materials which need plasticizing and are capable of forming water-proofing and heat-sealing compositions and a plasticizer therefor comprising an ester of a fatty acid having at least three carbon atoms, a phthalimidoethyl alcohol, the film-forming material being present in a proportion of 40 to 95% by weight of the total solids in the composition, and the ester being present in a proportion of 5 to 45% by weight of the total solids.

6. A composition of matter comprising an organic plastic film-forming material, selected from the group consisting of thermoplastic and thermosetting materials which need plasticizing and are capable of forming water-proofing and heat-sealing compositions and a plasticizer therefor comprising phthalimidoethyl propionate, the film-forming material being present in a proportion of 40 to 95% by weight of the total solids in the composition, and the ester being present in a proportion of 5 to 45% by weight of the total solids.

7. A composition of matter comprising an organic plastic film-forming material, selected from the group consisting of thermoplastic and thermosetting materials which need plasticizing and are capable of forming water-proofing and heat-sealing compositions, a plasticizer therefor comprising phthalimidoethyl propionate, a resin, an oleaginous substance, and a wax, the ratio between the film-forming material and the plasticizer being between 1:1 and 3:1.

8. A moistureproofing composition comprising an organic plastic film-forming material, selected from the group consisting of thermoplastic and thermosetting materials which need plasticizing and are capable of forming water-proofing and heat-sealing compositions, a plasticizer therefor comprising a phthalimido ester of an aliphatic fatty acid having at least three carbon atoms, a wax, and a solvent, the film-forming material being present in a proportion of 40 to 95% by weight of the total solids in the composition, and the ester being present in a proportion of 5 to 45% by weight of the total solids.

9. A moistureproofing coating composition in accordance with claim 3 in which the film-forming material is a urea-formaldehyde resin in a thermoplastic, incompletely polymerized stage.

RALPH T. K. CORNWELL.

REFERENCES CITED

The following references are of record in the file of this patent:

UNITED STATES PATENTS

| Number | Name | Date |
| --- | --- | --- |
| 2,073,310 | Malm et al. | Mar. 9, 1937 |
| 2,343,198 | Moore | Feb. 29, 1944 |